Patented Oct. 31, 1922.

1,434,306

UNITED STATES PATENT OFFICE.

KARL MIESCHER, OF BASEL, SWITZERLAND, ASSIGNOR TO SOCIETY OF CHEMICAL INDUSTRY IN BASLE, OF BASEL, SWITZERLAND.

AMINOALCOHOL OF THE QUINOLINE SERIES AND PROCESS OF MAKING SAME.

No Drawing.   Application filed July 26, 1921.   Serial No. 488,161.

*To all whom it may concern:*

Be it known that I, KARL MIESCHER, a citizen of the Swiss Republic, and resident of Basel, Switzerland, have invented new and useful Aminoalcohols of the Quinoline Series and Processes of Making Same, of which the following is a full, clear, and exact specification.

The present invention relates to the manufacture of aminoalcohols by starting from 2-phenylquinoline-4-carboxylic acid its derivatives (as for instance 2-phenyl-4-cyanquinoline and substitution products as for instance 2-phenyl-6-ethoxyquinoline-4-carboxylic acid). The 2-phenylquinoline-4-carboxylic acid can be tranformed into 2-phenylquinolyl-4-alkylketones, either by condensing its esters with esters of fatty acids in presence of sodium ethylate to fatty acid esters of 2-phenyl-4-quinoloyl and subjecting these latter to the ketone splitting off by means of acids or by decomposing the nitrile of 2-phenylquinoline-4-carboxylic acid according to the method of Grignard.

The production of 2-phenylquinoline-4-methylketone is for instance shown by the following scheme:

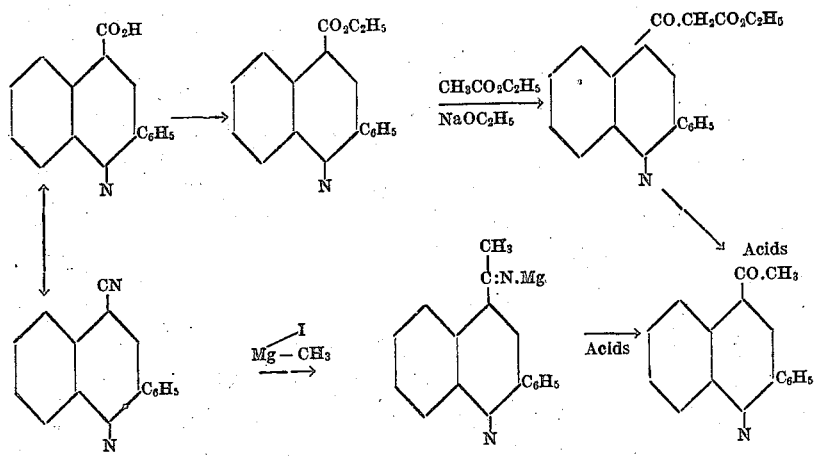

From the ketones can be prepared the corresponding aminoalcohols by reduction, by passing through the isonitroso compounds. Thus one can obtain for instance from 2-phenylquinolyl-4-methylketone the 2-phenylquinolyl-4-aminoethanol by reducing the corresponding isonitrosoketone.

The N-substituted alcohols are obtained by halogenating the ketone in the alkyl group and by reacting with amines on the halogenketones. For instance the 2-phenylquinolyl-4-methylketone can be transformed by brominating into 2-phenylquinolyl-4-brommethylketone, which combines with amines as for instance dimethylamine, to aminoketones, which can themselves be reduced to 2-phenyl-4-aminoethanol bases.

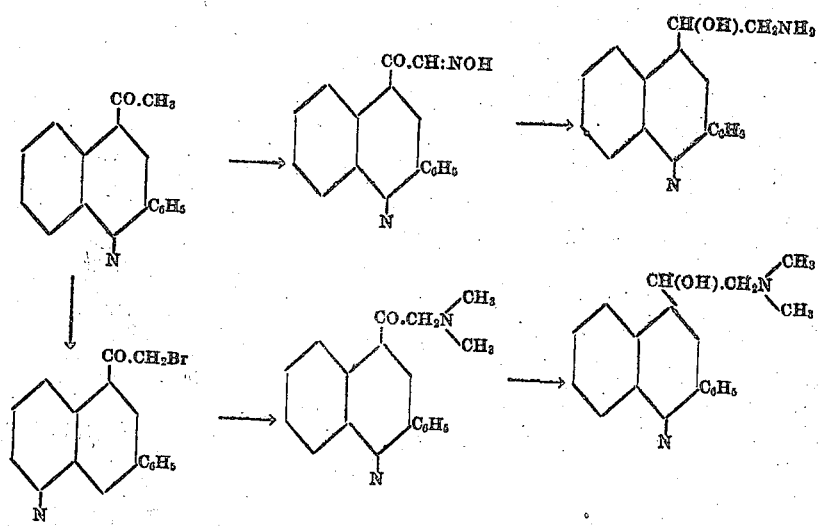

Analogous bodies have already been prepared by starting from the cinchoninic acid or from the quininic acid and their nitriles. The use of 2-phenylquinoline-4-carboxylic acid as parent material for the syntheses signifies an essential progress relatively to the previously known process, since the 2-phenylquinoline-4-carboxylic acid is by itself already therapeutically active, not only because it favors the elimination of uric acid but also because it has antipyretic and analgetic properties. On the contrary cinchoninic and quininic acids are without action, as it is well known. The 2-phenylquinoline shows also relatively to the quinoline itself according to the investigations of Grethe and Tappeiner (Deutsches Archiv für klinische Medizin 56, 189, 369, (1896) a manifoldly enhanced action against paramecia. This favorable influence of the phenyl group in the quinoline is also found again completely in the new derivatives.

Examples.

1. Preparation of the 2-phenyl-4-quinoloyl-acetic ethylester.

277 parts of 2-phenylquinoline-4-carboxylic ethylester, 68 parts of sodiumethylate and 88 parts of dry acetic ethylester are heated in 200 parts of toluene for 24 hours on a water bath, the whole being dissolved. Then the solution is cooled down, the sodium salt of the phenylquinolylacetic ester is extracted with water, the resulting solution acidulated with sulfuric acid until it shows an acid reaction with Congo and the precipitating heavy oil is dissolved in ether. After drying and evaporation of the solvent, there remains the 2-phenylquinoloyl-4-aceticethyl ester in form of an oil which solidifies after a certain time and may be recrystallized from a little methylalcohol or from ligroine. It crystallizes in the form of yellowish prisms melting at 52–54° C.

Its methylalcoholic solution gives with ferrichloride a red-brown coloration and with copper acetate a difficultly soluble bright-green copper salt.

With strong hydrochloric or sulfuric acid there result intense-yellow salts capable of being hydrolized by water.

2. Preparation of the 2-phenylquinolyl-4-methylketone.

(a) from phenylquinoloylaceticester.

1 part of 2-phenyl-4-quinoloylaceticethylester is heated with 8 parts of sulfuric acid of 25 per cent on a water bath. There is formed a ketone sulfate, while carbonic acid is evolved. By treating with sodium carbonate and with ether the free ketone is separated and can be obtained by evaporation of the ether in form of an oil solidifying in presence of alcohol.

The 2-phenylquinolyl-4-methylketone thus obtained is formed by yellow crystals melting at 75° C. It is easily soluble in benzene and in hot alcohol, difficultly soluble in ether and in cold alcohol. Its hydrobromide constitutes yellow crystals melting at 240° C.

Isonitrosoketone.

49.4 parts of 2-phenylquinolyl-4-methylketone are dissolved together with 23.4 parts of amylnitrite in 120 parts of benzene and the mixture is poured into a solution of 4.1 parts of sodium in 100 parts of absolute alcohol while stirring. The deep-brown solution is let to stand for a long time in a well closed ice-safe. The sodium salt of the isonitrosoketone precipitates. It is dissolved in water; this solution is shaken with benzene and acidulated with the calculated quantity of acetic acid, whereby the isonitrosoketone is precipitated. It crystallizes from alcohol in the form of yellowish crystals and melts at 182° C. with decomposition. It is insoluble in water, benzene and carbon sulfide, difficultly soluble in ether and soluble in acetone, boiling alcohol or xylene.

(b) *from 2-phenyl-4-cyanquinoline.*

2-phenyl-4-cyanquinoline is prepared according to the German Patent Specification 288243 by distilling the amide of 2-phenyl-quinoline-4-carboxylic acid. Into a solution of 23 parts of phenylcyanquinoline in dry benzene is introduced, drop by drop, while cooling, an ethereal solution of methylmagnesium iodide prepared from 142 parts of methyliodide and 24.3 parts of magnesium. Hereafter the mass is heated for 2 hours on a water-bath; after cooling there is added ice thereto, and it is acidulated with acetic acid. The separation is then effected and the solvent is evaporated. By triturating the residue with alcohol, the phenylquinolyl methylketone separates in a crystalline state.

(3) *Preparation of 2-phenyl-quinolyl-4-bromomethylketone.*

The hydrobromide of 2-phenylquinolyl-4-bromomethylketone is obtained with an excellent yield by brominating the phenylquinolineketone in concentrated hydrobromic acid or in an organic solvent.

The 2-phenylquinolyl-4-acetic ester can also be brominated and the carbethoxyl group be split off in the same operation by heating the solution of hydrobromide.

(1). 16.4 parts of phenylquinolylmethylketone hydrobromide are dissolved in 50 parts of glacial acetic acid at 90° C., there are added while stirring, 8 parts of bromine and 10 parts of glacial acetic acid, drop by drop. The 2-phenylquinolyl-4-bromomethylketone hydrobromide separates as intensely yellow colored crystals which are filtered off in the cold. It melts unsharply at about 225° C. with decomposition. The free base forms bright-yellowish crystals melting at 91° C.

(2). 18.5 parts of 2-phenylquinolyl-4-methylketone are dissolved in 750 parts of hot concentrated hydrogen bromide of specific gravity of 1.48, and to the solution thus obtained there are added, drop by drop, 12 parts of bromine dissolved into 50 parts of hydrogen bromide at 70° C., while stirring. The hydrobromide of the bromoketone is separated, after cooling, by filtration and washed with alcohol and ether.

(3). 120 parts of 2-phenylquinolyl-4-aceticethylester are dissolved in 1500 parts of hydrogen bromide of specific gravity of 1.45 at 55° C. and 60 parts of bromine dissolved in 200 parts of hydrogen bromide are added thereto, drop by drop, while stirring. At the end, the temperature rises to 90° C. whilst carbonic acid escapes. After cooling the bromoketone is separated by filtration.

(4) *Preparation of the aminoketones.*

The aminoketones are obtained advantageously by reaction of 1 mol. of a salt of 2-phenylquinolyl-4-halogenalkylketone with 3 mol. of a free amine. But the said aminoketones are not stable and are best isolated as hydrochloride or hydrobromide.

(a) To 13.5 parts of dimethylamine dissolved in 400 parts of benzene, are added by portions, while cooling with ice, 40.7 parts of 2-phenylquinolyl-4-bromomethylketone hydrobromide. After standing for 1 hour the dimethylamine hydrobromide is precipitated quantitatively. After filtration, the residue is washed with benzene and from the yellow solution the aminoketone is precipitated with somewhat alcoholic hydrochloric acid than the calculated quantity.

The 2-phenylquinolyl-4-dimethylaminoethanone monohydrochloride separates as bright-yellow crystal-dust. It crystallizes from absolute alcohol by addition of ether and melts at 208° C. with decomposition.

The corresponding monohydrobromide melts unsharply at about 206° C.

(b) 4.38 parts of diethylamine are dissolved in 70 parts of ether, and to the resulting solution are added 8.14 parts of bromoketone hydrobromide while cooling with ice. The product of reaction is isolated as indicated under a. The 2-phenylquinolyl-4-diethylaminoethanone monohydrobromide is obtained by crystallization from alcohol and ether in the form of bright-yellow felt-like little needles melting at about 164° C. with decomposition.

(c) Into 31.8 parts of piperidine dissolved in 600 parts of absolute ether, are introduced, while stirring and cooling with ice, 50.9 parts of 2-phenylchinolyl-4-bromomethylketone hydrobromide. The reaction product is isolated as indicated under a.

The 2-phenylquinolyl-4-piperididoethanone monohydrochloride melts at 235° C. and the corresponding monohydrobromide at about 241° C., both with decomposition.

(5). *Preparation of aminoalcohols.*

The aminoalcohols with primary aminogroup can be prepared by reducing the corresponding isonitrosoketone, whilst the N-substituted aminoalcohols can be obtained easily by reduction of the corresponding aminoketones. The N-substituted free bases precipitate in an amorphous state from the aqueous solution of their salts on addition of alkalies; they are easily soluble in all solvents except in petroleum ether and in water. They cannot be preserved for a long time and become quickly brown in the air. The bases give monoacid salts difficultly soluble in water and biacid salts readily soluble in water.

(a) 6.9 parts of 2-phenylquinolyl-4-isonitrosoketone are dissolved in 60 parts of formic acid of 50 per cent and to the resulting solution are added, while stirring, 5.9 parts of zinc dust. After the achievement of the reaction, the mass is diluted with water and the zinc is precipitated by means of hydrogene sulfide. The filtrate is concentrated and afterwards sodium acetate is added thereto in order to separate a secondary product and the base not difficultly soluble in water is precipitated with a concentrated solution of potassium carbonate. This base is extracted with ether and isolated in the form of hydrochloride. The 2-phenylchinolyl-4-aminoethanol dihydrochloride constitutes yellowish, nearly white crystals, readily soluble in water, which, when crystallized from alcohol, melt at 145° C. to a dull mass which clears at about 190° C.

(b) 31 parts of 2-phenylquinolyl-4-dimethylaminoethanone hydrobromide are suspended in a twentyfold quantity of water and shaken with hydrogen after a molecular quantity of hydrochloric acid and 25 parts of a colloidal platinum solution of 0.4 per cent have been added. When the calculated quantity of hydrogen is absorbed and the whole is dissolved, the platinum is precipitated and filtered off and the ethanol-base is liberated by a solution of sodium carbonate. It precipitates as a white amorphous mass. The latter is dissolved in ether. By addition of the calculated quantity of alcoholic hydrochloric acid the dihydrochloride of 2-phenyl-4-quinolyl dimethylaminoethanol precipitates as a crystalline substance. It constitutes a white feebly yellowish powder easily soluble in water and hot alcohol, melting unsharply at about 175° C. with decomposition.

(c) 10 parts of 2-phenylquinolyl-4-diethylaminoethanone hydrobromide are shaken in 150 parts of water and the molecular quantity of hydrochloric acid with hydrogene in presence of spongy platinum until no further absorption of hydrogen takes place. The platinum is then filtered off and the product isolated as indicated under b.

The 2-phenylquinolyl-4-diethylaminoethanol dihydrochloride melts at about 185° C. while becoming brown. It is yellowish white, easily soluble in water and hot alcohol and difficultly soluble in acetone.

(d) 4.6 parts of 2-phenylquinolyl-4-piperidoethanone hydrochloride are dissolved in 50 parts of formic acid and to the resulting solution there are added progressively 1.2 parts of zinc dust, while stirring. The reaction achieved, the mass is supersaturated with alkali, the base dissolved in ether and precipitated therefrom by alcoholic hydrochloric acid.

The 2-phenylquinolyl-4-piperidoethanol dihydrochloride is a white, feebly, yellowish, crystalline powder, and melts at about 199° C., when recrystallized from alcohol, whilst the corresponding monohydrochloride melts at about 162° C. The former is easily soluble in water, the latter more difficultly.

If the base is liberated from an aqueous solution of the salts with a solution of sodium carbonate, it precipitates in the form of white flocks. When washed with water, pressed on clay and dried over a mixture of lime and sodium hydroxide, the base softens at about 48° C. and melts at about 54° C. By standing it becomes quickly brown and smells like piperidine.

What I claim is:

As new products, the aminoalcohols of the 2-phenylquinoline series having their aminoalcohol group in position 4 of the quinoline nucleus, which form yellowish white mono- or diacid salts soluble in water and hot alcohol and having valuable therapeutic properties.

In witness whereof I have hereunto signed my name this 14th day of July, 1921, in the presence of the subscribing witness.

KARL MIESCHER.

Witness:
AMAND RITTER.